(12) United States Patent
Mathew

(10) Patent No.: US 9,560,667 B2
(45) Date of Patent: Jan. 31, 2017

(54) SYSTEM FOR RADIO TRANSCEIVER TIMING

(71) Applicant: Keysight Technologies Singapore (Holdings) PTE. LTD., Minneapolis, MN (US)

(72) Inventor: Binu Mathew, Hampshire (GB)

(73) Assignee: Keysight Technologies Singapore (Holdings) Pte. Ltd., Singapore (SG)

( * ) Notice: Subject to any disclaimer, the term of this patent is extended or adjusted under 35 U.S.C. 154(b) by 0 days.

(21) Appl. No.: 14/652,654

(22) PCT Filed: Dec. 11, 2013

(86) PCT No.: PCT/GB2013/053258
§ 371 (c)(1),
(2) Date: Jun. 16, 2015

(87) PCT Pub. No.: WO2014/108666
PCT Pub. Date: Jul. 17, 2014

(65) Prior Publication Data
US 2015/0341947 A1  Nov. 26, 2015

(30) Foreign Application Priority Data

Jan. 10, 2013  (GB) .................................. 1300419.7

(51) Int. Cl.
*H04W 72/12* (2009.01)
*H04B 1/40* (2015.01)
(Continued)

(52) U.S. Cl.
CPC ........... *H04W 72/1215* (2013.01); *H04B 1/40* (2013.01); *H04W 56/00* (2013.01); *H04W 88/10* (2013.01)

(58) Field of Classification Search
None
See application file for complete search history.

(56) References Cited

U.S. PATENT DOCUMENTS

2007/0183461 A1\* 8/2007 Eyal ..................... H04B 7/2684
370/503
2008/0159239 A1   7/2008 Odlyzko et al.
(Continued)

FOREIGN PATENT DOCUMENTS

EP    2624639 A1    7/2008
EP    2506634 A2    3/2012
(Continued)

OTHER PUBLICATIONS

International Search Report and Written Opinion dated Mar. 27, 2014, regarding PCT/GB2013/053258.
(Continued)

*Primary Examiner* — Alejandro Rivero

(57) ABSTRACT

A transceiver adapted to emulate devices using one or more of a plurality of different radio access protocols. The transceiver comprises a timing module, the timing module being adapted to maintain a record of the current timing state which would apply to each of the different radio access protocols the transceiver is able to use, if that radio access protocol was being used. When the transceiver changes a radio access protocol being used to emulate a device from a first radio access protocol used to emulate a first device to a second radio access protocol used to emulate a second device, the transceiver is adapted to use the record of the current timing state which would apply to the second radio access protocol to set the timing of the second radio access protocol.

19 Claims, 2 Drawing Sheets

(51) Int. Cl.
*H04W 56/00* (2009.01)
*H04W 88/10* (2009.01)

(56) References Cited

U.S. PATENT DOCUMENTS

2011/0207490 A1  8/2011  Lee et al.
2012/0282975 A1  11/2012  Mujtaba et al.

FOREIGN PATENT DOCUMENTS

| WO | 0247461 A2 | 6/2002 |
| WO | 2008082753 A1 | 7/2008 |
| WO | 2010051517 A2 | 5/2010 |
| WO | 2012063491 A1 | 5/2012 |

OTHER PUBLICATIONS

Search Report dated Jul. 4, 2013, regarding UK Application No. GB1200419.7.
International Preliminary Report on Patentability dated Jul. 14, 2015 for PCT Application No. PCT/GB2013/053258.
Search Report dated Jul. 4, 2013 for UK Application No. GB1300419.7.

* cited by examiner

US 9,560,667 B2

SYSTEM FOR RADIO TRANSCEIVER TIMING

CROSS-REFERENCE TO RELATED APPLICATIONS

This application is the National Stage filing under 35 U.S.C. 371 of International Application No. PCT/GB2013/053258, filed on Dec. 11, 2013, which claims the benefit of earlier filing date and right of priority to United Kingdom (Great Britain) Application Serial No. 1300419.7, filed on Jan. 10, 2013, the contents of all of which are expressly incorporated by reference herein in their entireties.

FIELD OF THE INVENTION

This invention relates to a system for radio transceiver timing, and in particular to a system for radio transceiver timing in a base station emulator.

DESCRIPTION OF THE RELATED ART

In the field of mobile communications, the communications protocols and standards are often referred to as Radio Access Technologies (RATs).

There are a number of different radio communication protocols and standards in use, and it is expected that more protocols and standards will be developed in the future. Each of these protocols and standards has an associated timing scheme defining the order and timing of communications actions, and although different protocols and standards may share a common timing scheme there is no requirement that this be the case.

This can give rise to problems when a radio transceiver is required to switch between different RATs, as the differences in the timing schemes used may make it difficult and/or time consuming to make the switch, or require additional transceiver hardware to handle the switch, thereby increasing costs.

One exemplary application where this problem may be encountered is in interoperability testing of mobile devices, where a radio transceiver may be required to emulate devices using a number of different RATs simultaneously and/or in succession.

It is an object of the present apparatus and method for radio transceiver timing to address these problems.

SUMMARY OF THE INVENTION

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a first aspect, the invention provides a transceiver adapted to emulate devices using one or more of a plurality of different radio access protocols, the transceiver comprising a timing module: the timing module being adapted to maintain a record of the current timing state which would apply to each of the different radio access protocols the transceiver is able to use, if that radio access protocol was being used; whereby, when the transceiver changes a radio access protocol being used to emulate a device from a first radio access protocol used to emulate a first device to a second radio access protocol used to emulate a second device, the transceiver is adapted to use the record of the current timing state which would apply to the second radio access protocol to set the timing of the second radio access protocol.

The transceiver may be adapted to use the record of the current timing state which would apply to the second radio access protocol to control the time of the changeover from emulating the first device using the first radio access protocol to emulating the second device using the second radio access protocol.

Additionally or alternatively, the transceiver may be adapted to changeover from emulating the first device using the first radio access protocol to emulating the second device using the second radio access protocol at a common frame boundary time corresponding to a frame boundary time of each of the first and second radio access protocols.

Preferably, the common frame boundary time corresponds to a frame boundary time of every radio access protocol the transceiver is able to use.

Preferably, the radio access protocols which the transceiver is able to use comprise the 2G protocol and/or the 3G and/or LTE protocols, and even more preferably the common frame boundary time may occur every 60 ms.

The transceiver may optionally comprise a reference clock timing signal and preferably the timing module comprises a counter adapted to maintain a record of the current timing state which would preferably apply to each of the different radio access protocols by counting cycles of the reference clock timing signal.

The transceiver is preferably able to emulate two or more devices simultaneously.

Preferably, the transceiver is able to emulate two or more different devices using different radio access protocols simultaneously.

Preferably, the transceiver is adapted to emulate devices using one or more of a plurality of different frame based communication radio access protocols and the record of the current timing state which would apply to each of the different radio access protocols comprises the frame number, sub-frame number and sample number of that radio access protocol.

In a second aspect, the invention provides a transceiver system comprising two or more transceivers according to the first aspect.

Preferably, one of the transceivers is adapted to provide a master reference clock timing signal to each of the transceivers, and all of the transceivers may preferably be adapted to use the master reference clock timing signal as a clock timing signal so that the timings of the different transceivers are synchronized.

Preferably, all of the transceivers are adapted to use a common reference clock timing signal from an external source as a clock timing signal so that the timings of the different transceivers are synchronized.

Preferably, the transceiver system further comprises a controller adapted to instruct the transceivers what devices to emulate using which radio access protocols and/or at which times.

The invention further provides systems, devices and articles of manufacture for implementing any of the aforementioned aspects of the invention.

DESCRIPTION OF FIGURES

The preferred and/or optional features may be combined as appropriate, as would be apparent to a skilled person, and may be combined with any of the aspects of the invention.

The invention will now be described in detail with reference to the following figures in which.

Figure 1:
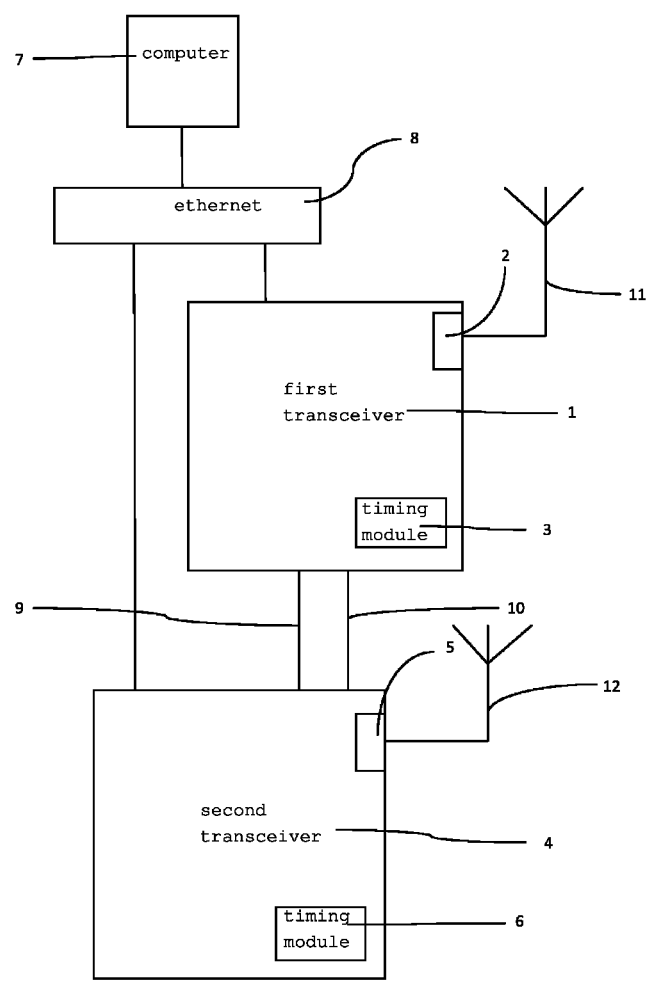
FIG. 1 is a diagram of an example of a system able to emulate devices according to an aspect of the present invention.

It will be appreciated that although features from each of the embodiments may be identified by difference reference numerals in the figures and throughout the description, similar features including the properties and functionality attributed thereto, from one embodiment may be interchangeable with those of another embodiment.

DETAILED DESCRIPTION OF THE INVENTION

In order to carry out interoperability testing of mobile communications equipment such as mobile telephones it is necessary to simulate conditions that the equipment may encounter in use. In particular, there is a requirement to expose the equipment to transmissions according to different communications protocols and standards, otherwise referred to as radio access technologies (RATs), while the equipment is operating in order to confirm that the different combinations of RATs will not interfere with proper operation of the equipment.

During a testing session or run, the mobile communication equipment under test may commonly be required to be sequentially exposed to several different combinations of multiple RATs. One approach to carrying out the interoperability testing is to use a number of reconfigurable transceivers which can emulate devices, for example base stations, using different RATs and to reconfigure the transceivers during the testing to emulate all of the required different RATs. It is generally desirable to maintain time synchronization of the different emulated RATs during a testing cycle in order to allow the switching between the different emulated RATs to be carried out, and to allow the test to be correctly completed. For example, Protocol Signaling messages used for triggering handovers, as defined in WCDMA (3G), rely on time synchronization between cells of the same RAT. Accordingly, if a transceiver is dynamically reconfigurable between emulating different RATs so as to reduce the number of transceivers required to carry out a testing cycle, in order for the transceiver to be used for testing Intra-Cell Handovers, then time synchronization needs to be maintained during a testing cycle.

FIG. 1 illustrates an example of a transceiver system useable to emulate multiple base stations for interoperability testing of mobile communications equipment according to the invention.

In the example illustrated in FIG. 1, a first transceiver 1 has an antenna port 2 and a timing module 3, and a second transceiver 4 has an antenna port 5 and a timing module 6. Each transceiver 1 and 4 is preferably able to transmit/receive radio signals to User Equipment (not shown) through its respective antenna ports 2 and 5.

The operations of the first and second transceivers 1 and 4 are in this example controlled by a computer 7, such as a personal computer or PC. The computer 7 is connected to the first and second transceivers 1 and 4 through a data communication network, such as an Ethernet switch 8, to allow the computer 7 to communicate with the transceivers 1 and 4. It will be appreciated that alternative means may be provided to connect the comprising means to the transceivers.

The first and second transceivers 1 and 4 are connected to each other by a timing synchronization cable 9, and by a reference clock signal cable 10.

In the illustrated example, each of the first and second transceivers 1 and 4 is able to emulate up to two mobile communications system base stations, which emulated base stations may be using the same or different RATs. The first and second transceivers 1 and 4 are also able to transmit radio signals emulating the two base stations through the respective antenna ports 2 or 5 to a test area where an item or items of equipment under test are located through respective antennae 11 and 12 connected to the antenna ports 2 and 5. The first and second transceivers 1 and 4 may for example be able to emulate base stations using RATs such as but not limited to GSM (2G), GPRS (2.5G), WCDMA (3G) and LTE (4G). The first and second transceivers 1 and 4 may for example be Anite 9000 transceivers produced by Anite Limited.

In alternative examples, the first and second transceivers 1 and 4 may be able to transmit radio signals to an item or items of equipment under test using cabled connections connecting the respective antenna ports 2 and 5 to the equipment under test. In such examples, the cabled connections may be made via a specialized connector-cable assembly.

In operation, the computer 7 controls the operation of the transceivers 1 and 4 to emulate a predetermined series of base stations using various RATs in order to carry out a desired test session. In the illustrated example, multiple base stations can be simultaneously emulated on each transceiver. The computer 7 may optionally provide a graphical user interface (GUI) allowing the combinations of RATs to be emulated and/or the timings of switching between the different RATs by the transceivers 1 and 4 to be set by a user to define a desired test program.

Each transceiver 1 and 4 uses a reference clock timing signal to generate a baseband sampling clock signal and an RF clock signal which are used to generate output radio signals which are output through the respective antenna ports 2 and 5. When the transceivers 1 and 4 are also receiving radio signals, the baseband sampling clock signals and RF clock signals may be used to process radio signals which are received through the respective antenna ports 2 and 5.

Similarly to the transmit radio signals discussed above, in the illustrated example, the received radio signals may be received through respective antennae 11 and 12 connected to the antenna ports 2 and 5. It will be appreciated that in alternative examples cabled connections may be used.

In operation, one of the transceivers 1 and 4 may be designated to be the master transceiver. In the illustrated embodiment, the first transceiver 1 is designated as the master transceiver, and when the computer 7 instructs a test program to be started, the transceivers 1 and 4 are instructed what RATs to emulate and the timing of both of the transceivers 1 and 4 is started simultaneously by a synchronization pulse sent through the synchronization cable 9 from the first master transceiver 1 to the second transceiver 4.

In this example where the first transceiver 1 is designated as the master transceiver, the reference timing clock signal of the first transceiver 1 is supplied to the second transceiver 4 through the reference clock signal cable 10. The reference timing clock signal of the first master transceiver 1 is used as a master clock timing signal by both of the first and second transceivers 1 and 4. Alternately, an external reference clock source can be used, and this reference clock signal can be fed to both transceivers 1 and 4.

In the illustrated example, a separate synchronization cable 9 and reference clock signal cable are shown, for clarity. However, it will be appreciated that these two cables 9 and 10 may be replaced by a single combined cable or by other suitable means.

The first and second transceivers 1 and 4 both use the same reference signal as their respective reference clock signal to generate their respective baseband sampling clock signals and RF clock signals, so that all of these clock signals of the different transceivers remain locked together and synchronized throughout the test program. In the illustrated example, this reference signal is the master clock timing signal produced by the first master transceiver 1.

Each timing module 3 and 6 comprises a counter driven by the baseband sampling clock of the respective transceiver 1 and 4. The counter of each timing module 3 and 6 maintains a count indicating the current system timing state that would apply for each possible RAT the respective transceiver 1 and 4 is able to emulate based on the number of pulses of the baseband sampling clock which have been counted since the start of the test program. In other words, the counter maintains a count for each possible RAT the respective transceiver 1 and 4 is able to emulate, the count indicating the current system timing state which the RAT would be in if the RAT had been used since the start of the test program. For example, where the RATs are frame based communication protocols, the count may indicate the frame number, sub-frame number, and sample number which a specific RAT would have reached if the RAT had been used since the start of the test program. The timing information from the counter is used to control the air-interface transmit/receive timing and the signal protocol timing of the emulated RAT.

In general, the counter of each timing module 3 and 6 maintains a separate count for each different RAT. However, where different RATs which can be emulated have the same timing, a common count may be used for both RATs. For example, the 3G and LTE communications protocols can use a common count; it would be appreciated that other examples will be known or can be ascertained.

In examples where the baseband sampling clock frequency is a rational multiple of the chip rate, the timing states may be implemented as conditional counters.
When the test program requires the emulated RATs to be changed, the computer 7 instructs one or both of the transceivers 1 and 4 accordingly. To change a RAT, the computer 7 instructs a transceiver to stop emulation of a current emulated RAT selected to be changed and to load the relevant components to enable emulation of a selected new RAT into the different protocol levels of the transceiver; for example, the PDCP, RLC, MAC and/or PHY layers, and place these layers in an appropriate configuration.

The relevant components required to emulate the new RAT may be downloaded to the transceivers 1 and 4 by the computer 7. In other examples, the components may be stored in a memory (not shown) provided in or connected to the transceivers 1 and 4.

When the relevant components have been loaded, the emulation of the new RAT is started and the physical (PHY) layer of the transceiver communicates with the timing module to obtain the count corresponding to the new RAT. This timing information is then used to set the states of all of the protocol layers of the new emulated RAT, such as the timings and/or FPGA (field-progammble date array) states.

Thus, when the transceiver 1 or 4 begins emulation of the selected new RAT, the transceiver 1 or 4 uses the count corresponding to the new RAT in the counter of its timing module 3 or 6 to set the timing state of the new emulated RAT.

Where the emulated RATs are frame based communications protocols, the change over between different RATs is arranged to take place at the time of the frame boundary between frames.

The change over between different RATs is arranged to take place at a time when all of the different RATs which could be emulated by the transceiver are at a frame boundary between frames. Such a simultaneous frame boundary common to all of the different RATs which could be emulated will be referred to as a common frame boundary in the present description. Where the transceiver is able to emulate 2G and 3G/LTE there will be such a common frame boundary every 60 ms, which period corresponds to thirteen 2G frames and six 3G/LTE frames. Conveniently, a 60 ms switch timing pulse may be derived from the master clock timing signal and may be used to synchronize the timing of RAT switching or changes.

By changing between different emulated RATs at the common frame boundary time, it can be ensured that the different RATs are immediately and correctly emulated.

The above discussion relates to changing a transceiver between emulating different RATs. The same process and considerations apply when a transceiver starts to emulate a new RAT, for example, when the testing program begins and/or if the transceiver changes from emulating one RAT to emulating two RATs, with the exception that there is no need to stop a currently emulated RAT.

Figure 2:
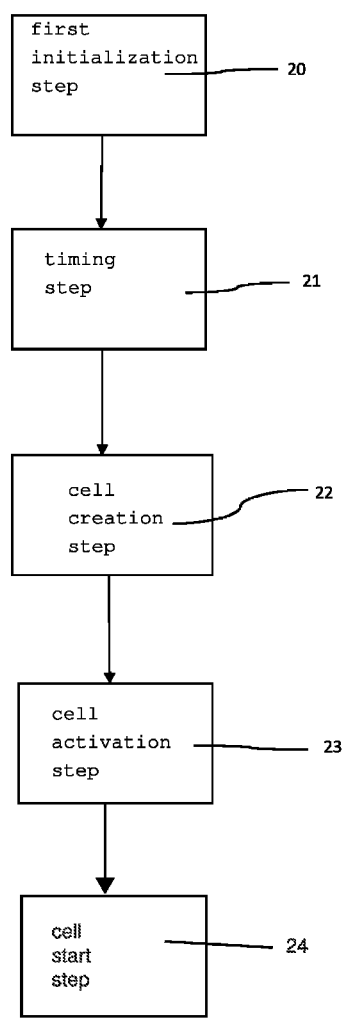
FIG. 2 is a flow diagram showing the operation of a single transceiver to emulate devices according to an aspect of the present invention.

An example of the procedure followed to create a single base station cell emulation will now be described with reference to FIG. 2. The procedure may be controlled by a script running on the computer 7 or other known means.

In a first initialization step 20, the computer 7 initializes the system and queries the system to determine what hardware is available, in the illustrated example the first and second transceivers 1 and 4. The computer 7 in this example is operable to determine the capabilities of the available hardware. In some examples, the transceivers 1 and 4 may identify their capabilities to the computer 7. In other examples, the transceivers 1 and 4 may identify their make and model 5 to the computer 7 and the computer 7 may use this to determine their capabilities; for example, by accessing a stored look up table or via other suitable means.

Next, in a timing step 21, the computer 7 instructs the transceiver 1 to start timing and counting. The transceiver 1 maintains timing records in a counter of its respective timing module 3 for all possible RATs which the transceiver 1 is able to emulate.

Next, in a cell creation step 22, the computer sends instructions to the first transceiver 1 identifying details of the type of base station cell to be emulated. For example, the instructions may identify the RAT to be used together with the relevant parameters of the PDCP, RLC, MAC and/or PHY layers, which are communicated to the relevant layers of the transceiver 1. The transceiver 1 then carries out cell creation, with the parameters identifying the features of the cell, such as the uplink and downlink frequencies, channel configurations, etc.

Next, in a cell activation step 23, the transceiver 1 activates the cell, and begins emulating a base station. A control element in the PHY layer of the transceiver 1 queries the timing module 3 to identify the time of the next common frame boundary, and to obtain the frame number and other timing information to be used in the cell emulation.

Finally, in a cell start step 24, at the common frame boundary time the transceiver 1 begins transmitting and optionally receiving radio signals emulating the base station cell through the antenna port 2, using the instructed RAT and at the timing instructed by the timing module 3.

The emulated cell is then live and active, and the transceiver 1 is able to interact with a device under test, such as a mobile communications User Equipment (UE) as if it was a base station generating a cell of the emulated type.

When the testing program has completed using the emulated cell, the transceiver can tear the cell down, stopping transmission of the cell and optionally may remove and delete the cell parameters ready for the cell to be replaced by a new base station cell emulation with a different RAT.

The procedure followed to create two base station cell emulations in a single transceiver is similar, and will also be described with reference to FIG. 2. The procedure may be controlled by a script running on the computer 7 or by other suitable means.

In the first initialization step 20, the computer 7 initializes the system and queries the system to determine what hardware is available, in the illustrated example of FIG. 1, the first and second transceivers 1 and 4. The computer 7 determines the capabilities of the available hardware as in the previous example.

Next, assuming that the transceiver 1 is capable of emulating two base stations simultaneously, in the timing step 21 the computer 7 instructs the transceivers 1 and 4 to start timing and counting as in the previous example.

Next, in the cell creation step 22 the computer sends instructions to the first transceiver 1 identifying details of the types of base station cells to be emulated. For example, the instructions may identify the RAT to be used for each cell together with the relevant parameters of the PDCP, RLC, MAC and/or PHY layers for each cell, which are communicated to the relevant layers of the transceiver 1. The transceiver 1 then carries out cell creation for both cells, with the parameters identifying the features of each cell, such as the uplink and downlink frequencies, channel configurations, etc.

Next, in the cell activation step 23 the transceiver activates the cell, and begins emulating the two base stations. A separate control element in the PHY layer of the transceiver 1 for each emulated base station cell queries the timing module 3 to identify the time of the next common frame boundary, and to obtain the frame number and other timing information to be used in the respective cell emulation.

Finally, in the cell start step 24, at the common frame boundary time, the transceiver 1 begins transmitting signals emulating the two base station cells through the antenna port 2, using the respective instructed RAT for each emulated base station cell at the timing instructed for that RAT by the timing module 3.

The emulated cells are then live and active, and the transceiver is able to interact with a device under test, such as mobile communications User Equipment (UE) as if it was two base stations generating cells of the emulated type.

A similar procedure can be used to create base station cell emulations in the different transceivers of a multi-transceiver system.

Figure 3:
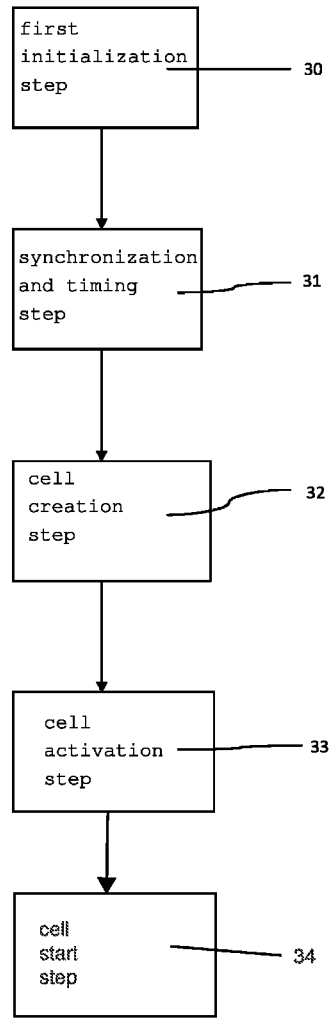
FIG. 3 is a flow diagram showing the operation of multiple transceivers to emulate devices according to an aspect of the present invention.

An example of the procedure followed to create base station cell emulation using multiple transceivers will now be described with reference to FIG. 3. The procedure may be controlled by a script running on the computer 7.

In a first initialization step 30, the computer 7 initializes the system and queries the system to determine what hardware is available, in the illustrated example of FIG. 1, the first and second transceivers 1 and 4. The computer 7 may determine the capabilities of the available hardware as in the previous examples.

Next, in a synchronization step 31, the computer 7 designates the first transceiver 1 as the master transceiver and instructs the transceivers 1 and 4 to start timing and counting. The first transceiver 1 sends a synchronization pulse to the second transceiver 4 through the synchronization cable 9 to start timing by the second transceiver 4. The first transceiver 1 sends a reference timing clock signal to the second transceiver 4 through the cable 10, this reference timing clock signal of the first transceiver 1 is used as a master clock timing signal by both of the first and second transceivers 1 and 4.

Alternately, an external reference clock source can be used, and this reference clock signal can be fed to both transceivers 1 and 4.

Each of the first and second transceivers 1 and 4 preferably maintain timing records in a counter of its respective timing module 3 and 6 for all possible RATs which the transceivers 1 and 4 are able to emulate.

Next, in a cell creation step 32 the computer sends instructions to the first and second transceivers 1 and 4 identifying details of the types of base station cell to be emulated. For example, the instructions may identify to each transceiver 1 and 4 the RAT or RATs to be used together with the relevant parameters of the PDCP, RLC, MAC and/or PHY layers, which are communicated to the relevant layers of the transceivers 1 and 4. The transceivers 1 and 4 then carry out cell creation, with the parameters identifying the features of the cell, such as the uplink and downlink frequencies, channel configurations, etc.

Next, in a cell activation step 33 the transceivers 1 and 4 activate the base station cells, and begin emulating base stations. A control element for each base station cell in the PHY layer of each of the transceivers 1 and 4 queries the timing module 3 and 6 of the respective transceiver 1 and 4 to identify the time of the next common frame boundary, and to obtain the frame number and other timing information to be used in the cell emulation.

Finally, in a cell start step 34, at the common frame boundary time, the transceivers 1 and 4 begin transmitting radio signals emulating the base station cells through the antenna ports 2 and 5, using the instructed RAT and at the timing instructed by the respective timing modules 3 and 6.

The emulated cells are then live and active, and the transceivers 1 and 4 are able to interact with a device under test, such as mobile communications User Equipment (UE) as if they were base stations generating cells of the emulated type.

The procedures explained above with reference to FIGS. 2 and 3 are also used when changing transceivers between emulating different RATs during a testing program. During a testing program the transceiver or transceivers are already operating to 5 emulate a RAT or RATs, and if there are multiple transceivers their timing is synchronized, and the timing modules of the transceivers are already maintaining the counts of the timing states of the possible different RATs, so it is not necessary to carry out the initializing step 20, 30, the timing step 21, or the synchronizing step 31.

For a single transceiver 1, in the cell creation step 22 the computer sends instructions to the first transceiver 1 identifying details of the types of base station cell to be emulated. For example, the instructions may identify to the transceiver 1 the RAT or RATs to be used preferably together with the relevant parameters of the PDCP, RLC, MAC and/or PHY layers, which are communicated to the relevant layers of the transceivers. The first transceiver 1 then carry out cell creation, with the parameters identifying the features of the cell, such as the uplink and downlink frequencies, channel configurations, etc.

Next, in a cell activation step 23 the first transceiver 1 activates the new base station cells, and begins emulating the new base station or base stations. A control element for each base station cell in the PHY layer of the first transceiver 1 queries the timing module 3 of the first transceiver 1 to identify the time of the next common frame boundary, the next 60 ms switch timing pulse, and to obtain the frame number and other timing information to be used in the respective new cell emulation.

Finally, in a cell start step 24, at the identified next common frame boundary time the first transceiver 1 stops transmitting radio signals emulating a base station cell or cells currently being emulated and begins transmitting radio signals emulating the new base station cell or cells through the antenna port 2, using the instructed RAT and at the timing instructed by the timing module 3.

The emulated cell or cells are then live and active, and the first transceiver 1 is able to interact with a device under test, such as a mobile communications User Equipment (UE) as if they were base stations generating cells of the emulated type.

For multiple transceivers the procedure is similar, in the cell creation step 32, the computer sends instructions to the first and second transceivers 1 and 4 identifying details of the types of base station cell to be emulated. For example, the instructions may identify to the first and second transceivers 1 and 4 the RAT or RATs to be used preferably together with the relevant parameters of the PDCP, RLC, MAC and/or PHY layers, which are communicated to the relevant layers of the transceivers. The first and second transceivers 1 and 4 then carry out cell creation, with the parameters identifying the features of the cells, such as the uplink and downlink frequencies, channel configurations, etc.

Next, in a cell activation step 33, the first and second transceivers 1 and 4 activates the new base station cells, and begins emulating the new base station or base stations. A control element for each base station cell in the PHY layer of the each transceiver queries the respective timing module 3 and 6 of the first and second transceivers 1 and 4 to identify the time of the next common frame boundary, the next 60 ms switch timing pulse, and to obtain the frame number and other timing information to be used in the respective new cell emulation. Finally, in a cell start step 34, at the identified next common frame boundary time the first and second transceivers 1 and 4 stop transmitting radio signals emulating a base station cell or cells currently being emulated and begin transmitting radio signals emulating the new base station cells through their respective antenna ports 2 and 5, using the instructed RATs and at the timing instructed by the timing modules 3 and 6.

The emulated cells are then live and active, and the first and second transceivers 1 and 4 are able to interact with a device under test, such as mobile communications User Equipment (UE) as if they were base stations generating cells of the emulated type.

In the illustrated example, the system comprises two transceivers. In other examples, the system may comprise only one, or three or more transceivers.

In the illustrated example, each transceiver can emulate up to two base stations. In other examples, each transceiver may be able to emulate only one, or three or more base station.

In the illustrated example, the transceivers are used to emulate base stations. In other examples the transceivers could be used to emulate other devices. In the illustrated example the start of emulation of an RAT, or the change over between emulating different RATs is described as taking place at a common frame boundary time. In most RATs a frame boundary time is defined as instant in time marking the boundary between successive frames, and generally will not have any defined duration. In such examples, the start or change over of emulation taking place at the common frame boundary time should be understood as the start or change over taking place close enough in time to the common frame boundary time that it is effectively regarded or treated as being substantially simultaneous with the common frame boundary time by the devices under test, and not as a requirement for absolute simultaneity. It will be understood that, in practice, absolute simultaneity of events is not generally possible to arrange.

The apparatus described above may be implemented at least in part in software. Those skilled in the art will appreciate that the apparatus described above may be implemented using general purpose computer equipment or using bespoke equipment.

The different components of the system may be provided by software modules executing on a computer.

The hardware elements, operating systems and programming languages of such computers are conventional in nature, and it is presumed that those skilled in the art are adequately familiar therewith. Of course, the server functions may be implemented in a distributed fashion on a number of similar platforms, to distribute the processing load.

Here, aspects of the methods and apparatuses described herein can be executed on a computing device such as a server. Program aspects of the technology can be thought of as "products" or "articles of manufacture" typically in the form of executable code and/or associated data that is carried on or embodied in a type of machine readable medium. "Storage" type media include any or all of the memory of the computers, processors or the like, or associated modules thereof, such as various semiconductor memories, tape drives, disk drives, and the like, which may provide storage at any time for the software programming. All or portions of the software may at times be communicated through the Internet or various other telecommunications networks. Such communications, for example, may enable loading of the software from one computer or processor into another computer or processor. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links or the like, also may be considered as media bearing the software. As used herein, unless restricted to tangible non-transitory "storage" media, terms such as computer or machine "readable medium" refer to any medium that participates in providing instructions to a processor for execution.

Hence, a machine readable medium may take many forms, including but not limited to, a tangible storage carrier, a carrier wave medium or physical transaction medium. Non-volatile storage media include, for example, optical or magnetic disks, such as any of the storage devices in computer(s) or the like, such as may be used to implement the encoder, the decoder, etc. shown in the drawings. Volatile storage media include dynamic memory, such as the main memory of a computer platform. Tangible transmission media include coaxial cables; copper wire and fiber optics, including the wires that comprise the bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards, paper tape, any other physical storage medium with patterns of holes, 5 a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Those skilled in the art will appreciate that while the foregoing has described what are considered to be the best mode and, where appropriate, other modes of performing the invention, the invention should not be limited to specific apparatus configurations or method steps disclosed in this description of the preferred embodiment. It is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings. Those skilled in the art will recognize that the invention has a broad range of applications, and that the embodiments may take a wide range of modifications without departing from the inventive concept as defined in the appended claims.

Although the present invention has been described in terms of specific exemplary embodiments, it will be appreciated that various modifications, alterations and/or combinations of features disclosed herein will be apparent to those skilled in the art without departing from the spirit and scope of the invention as set forth in the following claims.

The invention claimed is:

1. A transceiver adapted to emulate devices using one or more of a plurality of different radio access protocols, the transceiver comprising:
 a timing module adapted to maintain a record of the current timing state which would apply to each of the different radio access protocols the transceiver is adapted to use, if that radio access protocol was being used;
 wherein, when the transceiver changes a radio access protocol being used to emulate a device from a first radio access protocol used to emulate a first device to a second radio access protocol used to emulate a second device, the transceiver is adapted to: use the record of the current timing state which would apply to the second radio access protocol to set the timing of the second radio access protocol; and to emulate devices using one or more of a plurality of different frame based communication radio access protocols and the record of the current timing state which would apply to each of the different radio access protocols comprises the frames number, sub-frame number and sample number of that radio access protocol.

2. The transceiver of claim 1, wherein the transceiver is adapted to use the record of the current timing state which would apply to the second radio access protocol to control the time of the changeover from emulating the first device using the first radio access protocol to emulating the second device using the second radio access protocol.

3. The transceiver of claim 1, wherein the transceiver is adapted to changeover from emulating the first device using the first radio access protocol to emulating the second device using the second radio access protocol at a common frame boundary time corresponding to a frame boundary time of each of the first and second radio access protocols.

4. The transceiver of claim 3, wherein the common frame boundary time corresponds to a frame boundary time of every radio access protocol the transceiver is adapted to use.

5. The transceiver of claim 4, wherein the radio access protocols the transceiver is adapted to use comprise a 2G protocol, and a 3G protocol and/or an LTE protocol, and the common frame boundary time occurs every 60 ms.

6. The transceiver of claim 1, wherein the transceiver comprises a reference clock timing signal and the timing module comprises a counter adapted to maintain a record of the current timing state which would apply to each of the different radio access protocols by counting cycles of the reference clock timing signal.

7. The transceiver of claim 1, wherein the transceiver is adapted to emulate two or more devices simultaneously.

8. The transceiver of claim 7, wherein the transceiver is adapted to emulate two or more different devices using different radio access protocols simultaneously.

9. A transceiver system comprising:
 two or more transceivers adapted to emulate devices using one or more of a plurality of different radio access protocols,
 wherein at least one transceiver of the two or more transceivers comprises: a timing module adapted to maintain a record of the current timing state which would apply to each of the different radio access protocols the transceiver is adapted to use, if that radio access protocol was being used;
 wherein, when the at least one transceiver changes a radio access protocol being used to emulate a device from a first radio access protocol used to emulate a first device to a second radio access protocol used to emulate a second device, the transceiver is adapted to use the record of the current timing state which would apply to the second radio access protocol to set the timing of the second radio access protocol; and
 at least one transceiver is adapted to emulate devices using one or more of a plurality of different frame based communication radio access protocols and the record of the current timing state which would apply to each of the different radio access protocols comprises the frame number, sub-frame number and sample number of that radio access protocol.

10. The transceiver system of claim 9, wherein one of the transceivers is adapted to provide a master reference clock timing signal to each of the transceivers, and all of the transceivers are adapted to use the master reference clock timing signal as a clock timing signal so that the timings of the different transceivers are synchronized.

11. The transceiver system of claim 9, wherein all of the transceivers are adapted to use a common reference clock timing signal from an external source as a clock timing signal so that the timings of the different transceivers are synchronized.

12. The transceiver system of claim 9, further comprising a controller adapted to instruct the transceivers what devices to emulate using which radio access protocols and at which times.

13. The transceiver system of claim 9, wherein at least one of the transceivers is adapted to use the record of the current timing state which would apply to the second radio access protocol to control the time of the changeover from emulating the first device using the first radio access protocol to emulating the second device using the second radio access protocol.

14. The transceiver system of claim 9, wherein at least one of the transceivers is adapted to changeover from emulating the first device using the first radio access protocol to emulating the second device using the second radio access protocol at a common frame boundary time corresponding to a frame boundary time of each of the first and second radio access protocols.

15. The transceiver system of claim 14, wherein the common frame boundary time corresponds to a frame boundary time of every radio access protocol the at least one transceiver is adapted to use.

16. The transceiver system of claim 15, wherein the radio access protocols the at least one transceiver is adapted to use comprise a 2G protocol, and a 3G protocol and/or an LTE protocol, and the common frame boundary time occurs every 60ms.

17. The transceiver system of claim 9, wherein at least one of the transceivers comprises a reference clock timing signal and the timing module comprises a counter adapted to maintain a record of the current timing state which would apply to each of the different radio access protocols by counting cycles of the reference clock timing signal.

18. The transceiver system of claim 9, wherein the at least one transceiver is adapted to emulate two or more devices simultaneously.

19. The transceiver system of claim 18, wherein the at least one transceiver is adapted to emulate two or more different devices using different radio access protocols simultaneously.

* * * * *